Jan. 7, 1936. G. C. WOODRUFF Re. 19,815
INTERCHANGEABLE CONTAINER FREIGHT CAR
Original Filed April 24, 1928 4 Sheets-Sheet 1
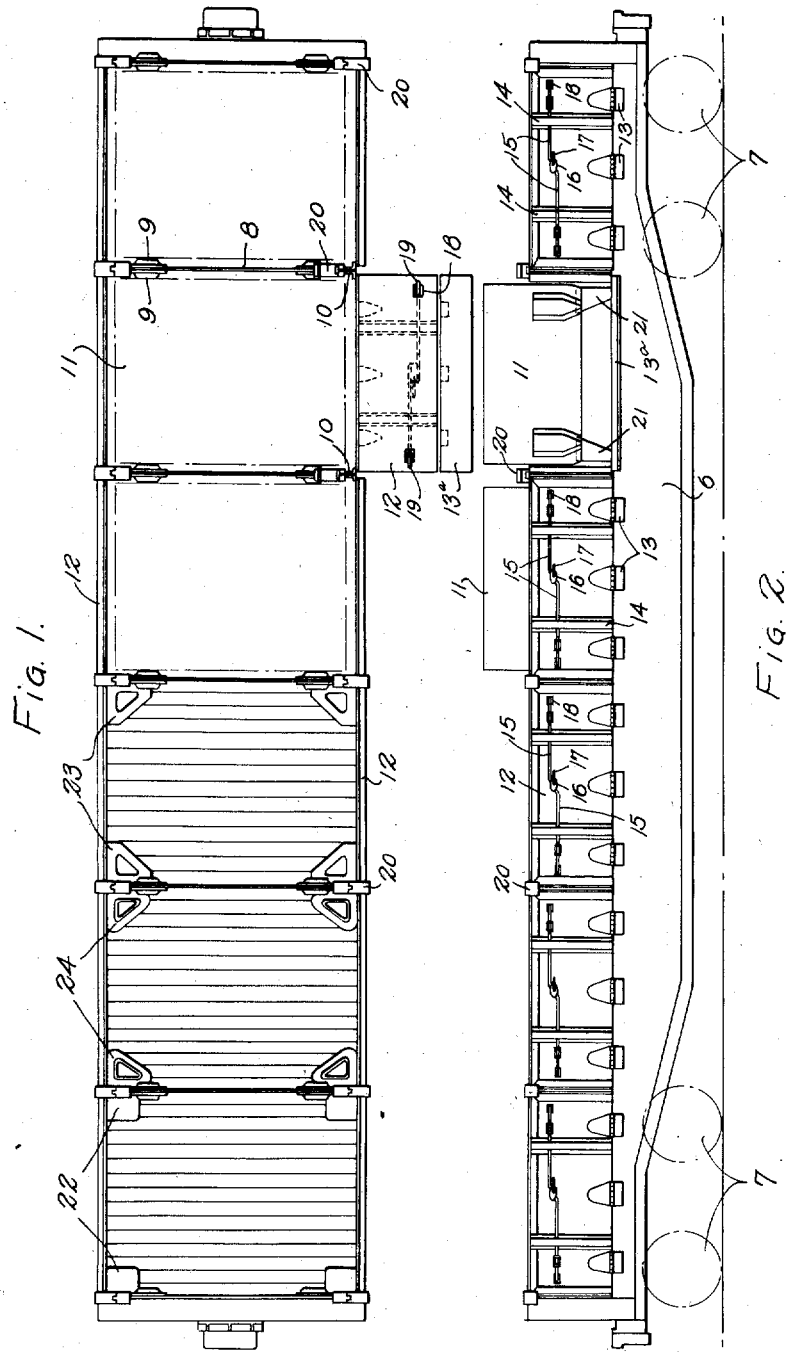
INVENTOR.
Graham C. Woodruff
BY
Edwin S. Clarkson
ATTORNEY.

Jan. 7, 1936. G. C. WOODRUFF Re. 19,815

INTERCHANGEABLE CONTAINER FREIGHT CAR

Original Filed April 24, 1928 4 Sheets-Sheet 2

Graham C. Woodruff INVENTOR.

BY Lewis S. Clarkson

ATTORNEY.

INTERCHANGEABLE CONTAINER FREIGHT CAR

Original Filed April 24, 1928 4 Sheets-Sheet 3

INVENTOR.
Graham C. Woodruff
BY
Frank A. Clarkson
ATTORNEY.

INTERCHANGEABLE CONTAINER FREIGHT CAR

Original Filed April 24, 1923 4 Sheets-Sheet 4

INVENTOR.
Graham C. Woodruff
BY
Edwin S. Clarkson
ATTORNEY.

Reissued Jan. 7, 1936 Re. 19,815

UNITED STATES PATENT OFFICE 19,815

INTERCHANGEABLE CONTAINER FREIGHT CAR

Graham C. Woodruff, Bronxville, N. Y., assignor to The L. C. L. Corporation, a corporation of Delaware Original No. 1,754,451, dated April 15, 1930, Serial No. 272,471, April 24, 1928. Application for reissue April 13, 1932, Serial No. 605,104

8 Claims. (Cl. 105—366)

One of the greatest problems facing the industrial world during the past few years is that of economy in human labor, and the substitution for it, when practical, of mechanical means to as great a degree as possible.

This problem is recognized in the many patents granted to the late Alfred H. Smith, as, for instance, in his Reissue Patent No. 16,073 of May 19, 1925.

The object of my invention is to provide a container car to handle interchangeable containers of the type shown in the said Smith patents, but other types of interchangeable containers may be handled without departing from the spirit of my invention.

According to my invention I provide the car with a plurality of bulkheads disposed transversely of the car and extending from side to side of the car, thereby forming a plurality of container stalls open at each end, so arranged as to facilitate loading and unloading of the containers at points where special facilities, such as overhead cranes, are not provided for this purpose, there being sections swingingly mounted to each side of the car, one for each end of each stall, said sections while in elevated position functioning as barriers at each end of each stall, and when in lowered position serving as gangways bridging the space between the side of the car and the freight platform, over which the containers may be moved to and from the stalls without the use of cranes. Means are provided to securely lock the sections in their elevated positions so that they function as barriers at each end of the stall to prevent the containers accidentally moving out of their stalls, thereby eliminating the possibility of their slipping off of the car or extending beyond the car outline while in transit, thus obviating all danger, wrecks, or side-swiping of other trains.

In the drawings:

Figure 1 is a top plan view of my improved car showing three containers on the car and three empty container stalls, one of the drop sections being shown in lowered position.

Figure 2 is a side elevation of Figure 1.

Figure 3:
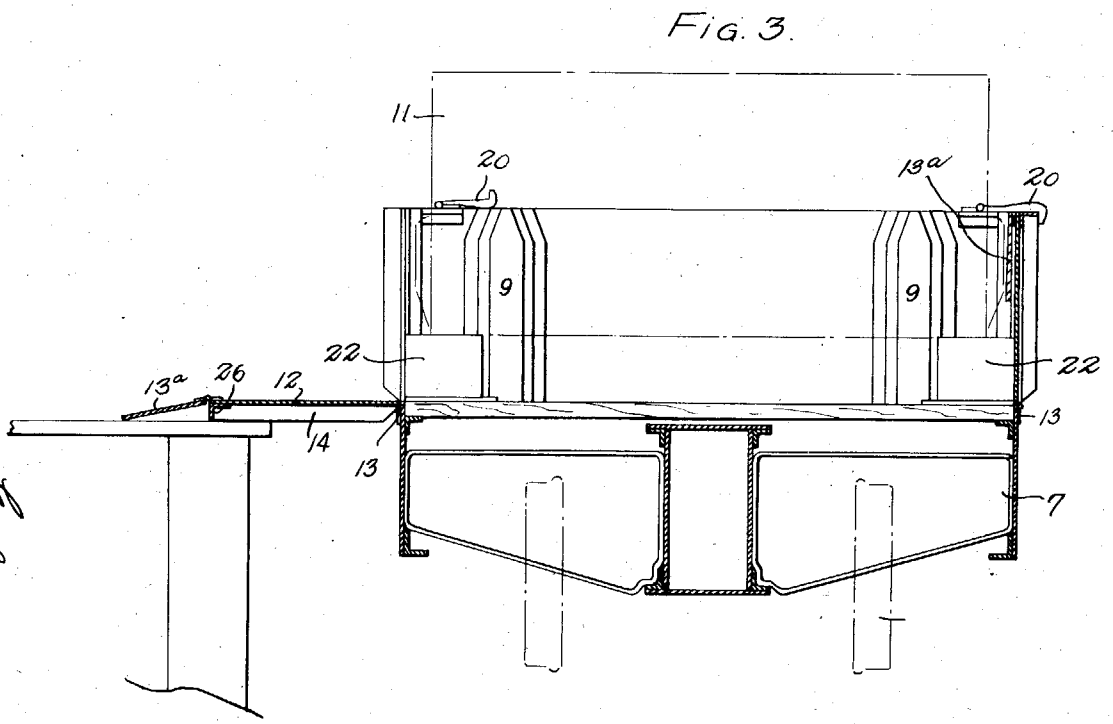
Figure 3 is a transverse vertical section of my improved car showing one of the drop swinging sections extending from the car to a station platform.
Figure 6:
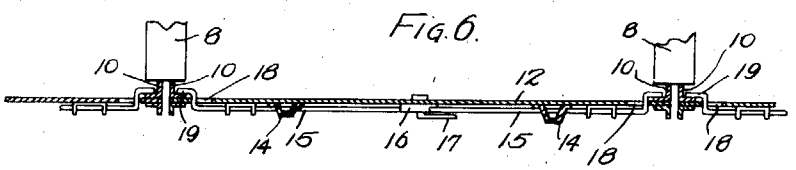
Figure 6 is an enlarged detail sectional view.

The reference numeral 6 designates the underframe of a car of any approved construction mounted on suitable trucks 7.

According to my invention the cars are equipped with bulkheads 8 extending transversely across the car from side to side. The number of these bulkheads per car depends on the length of the car, but for purposes of illustrating my invention I have shown the car equipped with seven bulkheads, including the two end bulkheads. These bulkheads extend upwardly from the underframe a material distance, and are provided on each side at each end with container guides 9 of any desired construction. The two end bulkheads have the container guides only on one side thereof, as shown in Figure 1. At the extreme ends of the bulkhead I provide angle irons 10 which constitute material abutments for the drop side sections to which I will hereinafter refer. These bulkheads divide the car into a series of stalls or sections each adapted to receive and hold while in transit a container 11, which container may be of any size desired that will fit in the stalls. It is, of course, obvious that the containers may be made in multiple, that is to say, a number of small containers may be placed in each stall.

The car is provided with a plurality of drop side sections 12 swingingly mounted to the car structure, one adjacent each end of each stall, as shown in Figures 1 and 2, said sections when in their elevated position functioning as barriers, or bulkheads at the ends of each container to prevent the accidental displacement of a container while in transit thereby eliminating the possibility of a container projecting beyond the sides of a car and sideswiping another train, and also preventing the container from falling off the car on to another track and causing a wreck.

Figure 4:
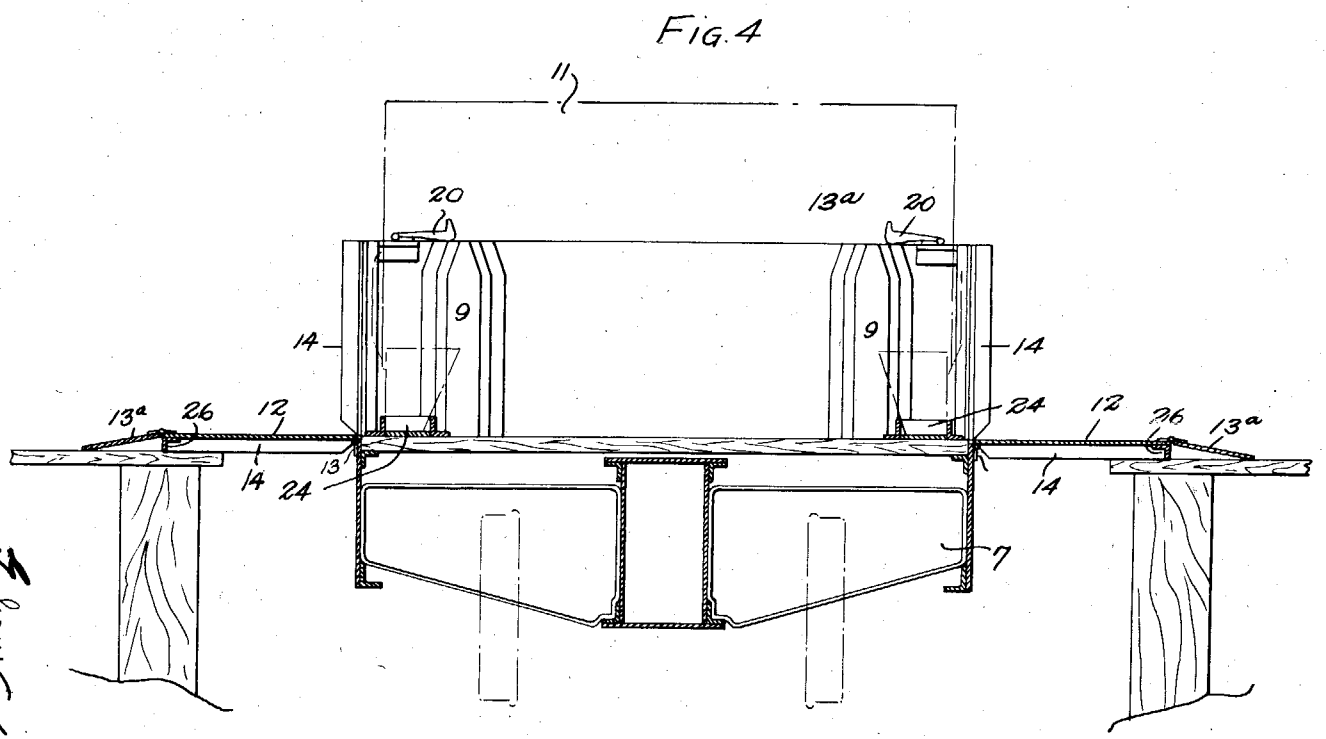
Figure 4 is a section similar to Figure 3 showing the drop side sections lowered on both sides of the car.
Figure 5:
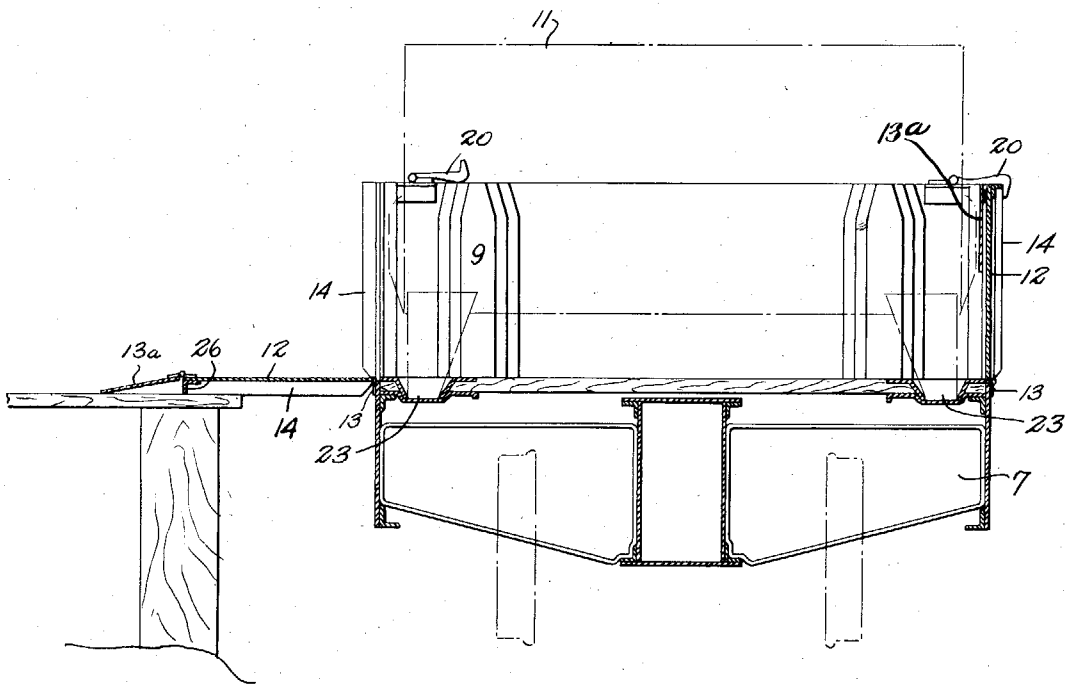
Figure 5 is a view similar to Figure 4 showing a slightly modified construction.

These drop side sections are connected to the car by means of the hinges 13 which may be of any desired construction so long as they are substantial. The drop side sections are provided with reinforcing beams 14 which may be of any desired commercial shape, said beams 14 materially rigidifying the drop side sections so that they will not be distorted when a container is rolled off the car across the side sections in loading and unloading the containers to and from the car. The drop side sections are provided with locking bolts 15 which are pivotally connected to a central link 16, which link in turn is pivotally mounted on the drop side section and is operated by means of a handle 17. The outer ends of the bolts 15 project through elongated openings 18 near the ends of the drop side sections as clearly shown in Figures 1 and 2, the portion 19 of the bolt at the end being spaced back from the inner face of the drop side section so that it is adapted to engage beyond the angular abutments 10 at the ends of the bulkhead, thereby locking the section in its elevated position. As additional guaranty for maintaining the drop side sections 12 in their elevated position, I pivotally mount a hook 20 at each end of each bulkhead 8, which hook is adapted to be moved over into engagement with the top portion of the drop side section, as more clearly illustrated in Figure 3. An apron 13a is connected by means of hinges to the top edge of the drop side sections 12 and is adapted to fold inwardly against the inner face of the drop side section when the section is in its elevated position. When the section is in its lowered position, as illustrated in Figures 3, 4, and 5, this hinged apron is extended, as shown in these figures, and forms a continuation of the drop side section, the apron 13a being inclined as shown. When the drop side section is in its lowered position, as shown in Figures 3, 4, and 5, it functions as a gangway between the side of the car and the station platform over which the containers may be moved to and from the car.

I prefer to have the bottom wall of the container, when loaded on the car, in its stall elevated above the floor of the car so that the platform of an electric truck or other conveyance may be run on the car under the container, such trucks being well known and provided with means whereby their platforms may be raised after they are under the container and thus raise the containers from the floor of the car and remove the containers to and from the car over the gangways 12 and 13a.

I also prefer to provide the containers with supporting legs 21 so that when the container is either on the car or on the station platform its bottom wall is elevated so that the electric truck, or other conveyance may be run underneath it, as above described. In case there are containers to be handled that are not provided with supporting legs 21, I may provide the car with supporting blocks 22 at each corner of each stall which will support the container with its bottom wall above the car floor.

The bulkheads 8 and the drop side sections 12 function to prevent the containers from shifting laterally or longitudinally on the car, and the removal of one container from a car does not reduce the stability of the remaining containers on a car because each container is provided with its particular bulkheads.

I may provide at each corner of each stall a floor socket 23 to receive the legs of the containers and thereby add security against the shifting of the containers on the car while in transit. These floor sockets may, as illustrated in Figure 4, at 24 project above the car floor, or, as shown at 25 in Figure 5, they may be sunk into the car floor. However, the mainstay or bracing against the shifting of the containers on the car resides in the bulkheads 8 and the drop side sections 12.

In the case of containers made without legs it is obvious that at stations there will be provided suitable supports similar to the supports 22 on the platform of the station upon which to raise the containers with its bottom wall elevated above the station platform so that the electric truck, or other conveyance can be run under the container and raise it for transportation to its stall on the car.

As is well known, it is becoming more and more the practice of railroads to ship goods in containers after the system set forth in the Smith patents, above referred to, and my improved car is designed to receive and transport these interchangeable containers and handle these containers at stations where there are no crane facilities for lifting them. Of course, the car is designed for through traffic as well as local traffic, and as the containers are built to a certain standard my improved car is built to that standard and the stalls are adapted to receive a single container or multiples of that size container.

The end edge portion of the drop side sections, when in elevated position, have a firm abutment against the angle irons 10 at the end of each bulkhead. These side drop sections are also provided at their upper edge with an angle iron 26 which rigidifies the upper edge of the section and functions as a support when the section is lowered to serve as a gangway, as clearly illustrated in Figures 3, 4, and 5.

As stated, my improved drop side container car and sectional carload containers are so arranged as to facilitate loading and unloading of containers at points where special facilities, such as overhead cranes, are not provided for this purpose.

I am aware that certain changes may be made in the details of construction of various parts without departing from the scope of the appended claims.

What I claim is:

1. In a car of the class described, the combination with an underframe, of a plurality of bulkheads extending from side to side of the underframe thereby dividing the car into a plurality of stalls open at each end, at both sides of the car, a plurality of side sections swingingly mounted to the car one at each end of each stall, said sections when lowered being adapted to serve as gangways, a locking means carried by each side section adapted to interlock with the ends of the bulkheads to hold the sections in raised position.

2. In a car of the class described, the combination with an underframe of a plurality of bulkheads extending from side to side of the underframe thereby dividing the car into a plurality of stalls open at each end, at both sides of the car, a plurality of side sections swingingly mounted to the car one at each end of each stall, said sections when lowered being adapted to serve as gangways, a locking means carried by each side section adapted to interlock with the ends of the bulkheads to hold the sections in raised position, and a safety catch on the ends of the bulkhead adapted to hook over the top edge of the sections.

3. In a car of the class described, the combination with an underframe of a plurality of bulkheads extending from side to side of the car thereby dividing the car into a plurality of stalls open at each end and transversely disposed of the car, container guides on each side and at each end of each bulkhead, a plurality of side sections swingingly mounted to the car one adjacent each end of each stall, and means to lock the said sections in elevated position, the said sections in lowered position being adapted to serve as gangways.

4. In a car of the class described, the combination with an underframe, of a plurality of bulkheads extending from side to side of the car, thereby dividing the car into a plurality of stalls transversely disposed of the car and open at each end, container guides on each side of and at the ends of each bulkhead, and a container support at each corner of each stall, a plurality of side sections swingingly mounted to the car one adjacent each end of each stall, and adapted when lowered to function as a gangway, and means to lock each section in its elevated position as a barrier at each end of each stall.

5. In a car of the class described, the combination with an underframe, of a plurality of fixed container stalls disposed transversely of the car and open at each end, a plurality of sections swingingly mounted to the car one adjacent each end of each stall, an apron hinged to the top of each section and adapted to fold in on the inner face of its section, and an angle iron secured to the outer face and at the top of the section designed to rigidly support the top edge of the section when the section is functioning as a ramp.

6. In a car of the class described, the combination with a car underframe, of a plurality of bulkheads extending from side to side of the underframe and dividing the car into a plurality of container compartments, each open at its ends to form doorways at opposite sides of the car, posts extending upwardly at the sides of the underframe and connected to and forming stiffening members for the ends of the bulkheads and also forming jambs at the opposite sides of the doorways, swinging side sections at opposite sides of the car forming doors for closing the doorways, said sections being hinged at their lower edges to swing upwardly between the posts and downwardly flush with the floors of the compartments to serve as gangways at an elevation to allow a container lift truck to travel over a let down side section onto the bottom of a container compartment beneath the bottom of a container therein, and coacting locking means on the side sections and posts to lock the side sections in closed position.

7. In a car of the class described, the combination with a car underframe, of a plurality of bulkheads extending from side to side of the underframe and dividing the car into a plurality of container compartments, each open at its ends to form doorways at opposite sides of the car, posts extending upwardly at the sides of the under frame and connected to and forming stiffening members for the ends of the bulkheads and also forming jambs at the opposite sides of the doorways, swinging side sections at opposite sides of the car forming doors for closing the doorways, said sections being hinged at their lower edges to swing upwardly between the posts and downwardly flush with the floors of the compartments to serve as gangways at an elevation to allow a container lift truck to travel over a let down side section onto the bottom of a container compartment beneath the bottom of a container therein, locking means carried by the side sections and engageable with the posts below the plane of the upper edges of the side sections to lock the side sections in closed position, and locking means at the ends of the abutments to engage the upper edges of the closed doors.

8. In a car of the class described, the combination with a car underframe, of a plurality of bulkheads extending from side to side of the under frame and dividing the car into a plurality of container compartments, each open at its ends to form doorways at opposite sides of the car, posts extending upwardly at the sides of the underframe and connected to and forming stiffening members for the ends of the bulkheads and also forming jambs at the opposite sides of the doorways, swinging side sections at opposite sides of the car forming doors for closing the doorways, said sections being hinged at their lower edges to swing upwardly between the posts and downwardly flush with the floors of the compartments to serve as gangways, elevated supports arranged alongside the abutments at opposite sides of each container compartment on which the bottom of a container may rest for supporting said container with its bottom spaced from the bottom of the container compartment at an elevation to allow a container lift truck to travel over a let down side section onto the bottom of a container compartment beneath the bottom of a container therein, and locking means on the side sections and the posts to lock the side sections in closed position.

GRAHAM C. WOODRUFF.